United States Patent [19]
Kajitani et al.

[11] Patent Number: 5,187,420
[45] Date of Patent: Feb. 16, 1993

[54] METHOD OF CALCULATING MOTOR CONTROL VOLTAGE AND MOTOR CONTROL DEVICE USING THE METHOD

[75] Inventors: Tetsuji Kajitani, Kawanishi; Yasumasa Matsuura, Nishinomiya; Hiroyuki Harada, Sakai; Toshihiko Araki, Kobe, all of Japan

[73] Assignee: Mita Industrial Co., Ltd., Japan

[21] Appl. No.: 550,722

[22] Filed: Jul. 10, 1992

[30] Foreign Application Priority Data

| Jul. 18, 1989 [JP] Japan | 1-185605 |
| Jul. 18, 1989 [JP] Japan | 1-185608 |
| Jul. 18, 1989 [JP] Japan | 1-185609 |

[51] Int. Cl.$^5$ ............................................. H02P 5/16
[52] U.S. Cl. ......................................... 318/823; 318/812; 318/799; 388/854; 388/806
[58] Field of Search .................. 388/811, 854, 806; 318/609, 610, 799, 823, 812

[56] References Cited

U.S. PATENT DOCUMENTS

| 3,950,682 | 4/1976 | Dohanich, Jr. | 388/811 |
| 4,575,667 | 8/1986 | Kurakake | 318/721 |
| 4,586,083 | 4/1986 | Omae et al. | 388/811 |
| 4,623,827 | 11/1986 | Ito | 388/811 |
| 4,733,144 | 3/1988 | Bisseling | 388/811 |
| 4,745,563 | 5/1988 | Kaku | 364/565 |

FOREIGN PATENT DOCUMENTS

| 688951 | 3/1967 | Belgium . |
| 2218689 | 9/1974 | France . |

OTHER PUBLICATIONS

Patent Abstracts of Japan, vol. 10, No. 125 (E-402)(2182) May 10, 1986 & JP-A-60 255 082 (Matsishita Denki Sangyo K.K.), Dec. 16, 1985.
Patent Abstract of Japan, vol. 7, No. 123 (E-178)(1268) May 27, 1983 & JP-A-58 039 292 (Oki Denki Kogyo K.K.) Mar. 7, 1983.
R. Bonert, "Design of a High Performance Digital Tachometer with a Microcontroller", IEEE Transactions of Instrumentation and Measurement, vol. 38, No. 6, New York, U.S., pp. 1104-1108 (Nov. 1989).
Gelli A. Spescha, "Ein Schnelles Digitales Drehzahlmessgerat", Messen Prufen Automatisieren, vol. 22, No. 10, Bad Worishofen de pp. 630-635 (Oct. 1986).

Primary Examiner—William M. Shoop, Jr.
Assistant Examiner—John W. Cabeca
Attorney, Agent, or Firm—Beveridge, DeGrandi, Weilacher

[57] ABSTRACT

A motor control device carries cut feedback control of a motor such that the rotational speed of the motor is equal to the command speed. A control voltage is first calculated as the sum of a first constant times the difference between the command speed and the actual rotational speed, a second constant times the actual rotational speed and a predetermined offset value. The calculated control voltage is corrected on the basis of the phase difference between the command speed and the actual rotational speed and a voltage after the correction is outputted as a motor control voltage. The rotational speed of the motor can be caused to rapidly follow the target speed by adjusting the first and second constants and the offset value whether the command speed is relatively low or high, thereby to make it possible to control the motor at a constant speed.

5 Claims, 6 Drawing Sheets

METHOD OF CALCULATING MOTOR CONTROL VOLTAGE AND MOTOR CONTROL DEVICE USING THE METHOD

BACKGROUND OF THE INVENTION

1. Field of the Invention

The present invention relates generally to a method of calculating a motor control voltage and a motor control device using the method, and more particularly, to a method of detecting the rotational speed of a motor to calculate a control voltage on the basis of the rotational speed detected and a motor control device for controlling the motor at constant speed on the basis of the results of the calculation.

2. Description of the Prior Art

As control methods for keeping the rotational speed of a motor constant, proportional control has been conventionally known. The proportional control is a control method of detecting the actual rotational speed of a motor and supplying a control voltage proportional to the difference between the actual rotational speed and the target speed.

However, the conventional proportional control has the disadvantage in that it does not rapidly follow the change in speed. More specifically, in a case where the actual rotational speed is lower than the target speed, if it is attempted to increase the rotational speed of the motor to the target speed, it takes relatively long for the rotational speed of the motor to reach the target speed. In particular, the higher the target speed is, the longer it takes for the rotational speed of the motor to reach the target speed.

The foregoing will be described more concretely.

An equation of motion at the time of application of a voltage V to the motor is generally as follows:

$$\frac{R_a GD^2}{375 K_T} \cdot \frac{dn}{dt} + K_e \cdot n = V - R_a(I_0 + T_{BL}/K_T) \quad (1)$$

where
- $R_a$: armature resistance [$\Omega$]
- $K_T$: torque constant [kgm/A]
- $K_e$: induced voltage constant [V/rpm]
- $I_0$: no-load current [A]
- $GD^2$: moment of inertia by load and motor [kgm$^2$]
- $T_{BL}$: sliding load [kgm].

This equation will be solved for n. If $n = N_P$ in the case of $t = 0$, n is as follows:

$$n = \frac{V - R_a(I_0 + T_{BL}/K_T)}{K_e} + \quad (2)$$

$$\left( N_P - \frac{V - R_a(I_o + T_{BL}/K_T)}{K_e} \right) \exp\left( -\frac{375 K_T K_e}{R_a GD^2} t \right)$$

and $$\frac{dn}{dt} = \frac{375 K_T K_e}{R_a GD^2} \times \quad (3)$$

$$\left( \frac{V - R_a(I_o + T_{BL}/K_T)}{K_e} - N_P \right) \exp\left( -\frac{375 K_T K_e}{R_a GD^2} t \right)$$

From this equation, acceleration a in a case where the sampled speed is $N_S$ is given by the following equation with the substitution $N_P = N_S$ and $t = 0$:

$$a = \left| \frac{dn}{dt} \right|_{t=0} = \frac{375 K_T K_e}{R_a GD^2} \times \quad (4)$$

$$\left( \frac{V - R_a(I_0 + T_{BL}/K_T)}{K_e} - N_s \right)$$

Let N be the target speed, $N_S$ be the sampled speed and $\Delta N$ be the difference therebetween. In this case, acceleration a in a case where a voltage $V = K\Delta N = K(N - N_S)$ is applied is as follows by the conventional proportional control with the substitution of $V = K\Delta N$, $N_S = N - \Delta N$ in the equation (4):

$$a = \frac{375 K_T K_e}{R_a GD^2} \times \quad (5)$$

$$\left\{ \frac{K\Delta N - R_a(I_0 + T_{BL}/ \times K_T)}{K_e} - (N - \Delta N) \right\} =$$

$$\frac{375 K_T K_e}{R_a GD^2} \times \left\{ (K/K_e + 1)\Delta N - N - \frac{R_a}{K_e}(I_0 + T_{BL}/K_T) \right\}$$

This equation shows that even if $\Delta N$ is the same value, the acceleration a is small if the target speed N is large while being large if N is small.

SUMMARY OF THE INVENTION

Therefore, the present invention has been made to eliminate such a disadvantage and has for its object to provide a motor control device capable of controlling a motor with it rapidly following the speed.

In accordance with an aspect, the present invention is characterized by comprising a method of calculating a control voltage in which in calculating a control voltage for controlling the rotational speed of a motor, the sum of a first constant times the difference between the target rotational speed and the actual rotational speed, a second constant times the actual rotational speed and a predetermined offset value is calculated to find the control voltage on the basis of the sum.

According to the above described calculating method, acceleration is determined by the difference between the target speed and the actual speed irrespective of the target speed. Further, desired acceleration can be obtained with respect to the difference in speed from the target by selecting an acceleration constant to be an arbitrary value. Accordingly, the motor can be controlled with it rapidly following the speed.

In accordance with another aspect, the present invention provides a motor control device adapted to correct the calculated control voltage on the basis of the phase difference between the target rotational speed and the actual rotational speed in addition to the above described calculating method.

The motor control device is thus constructed, thereby allowing the rotational speed of the motor to follow the target speed in a shorter time irrespective of whether the target speed is high or low.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description is now made, as one embodiment of the present invention, of a control circuit of a DC servomotor for driving an optical system (a lighting unit and a reflecting mirror) of an electrophotographic copying machine by way of example.

Figure 1:
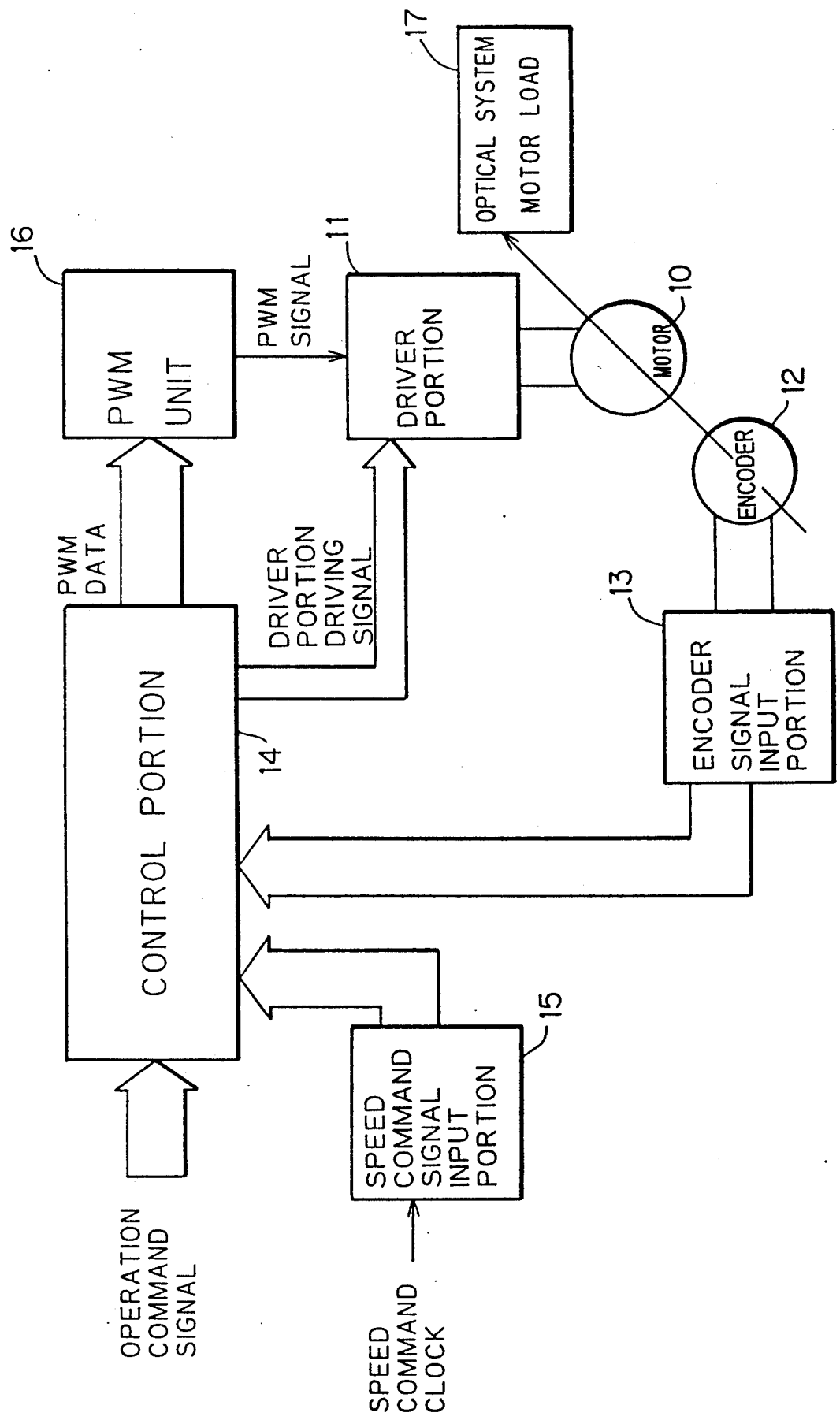
FIG. 1 is a block diagram showing the entire construction of a control circuit of a DC servomotor for driving an optical system of a copying machine to which one embodiment of the present invention is applied.

FIG. 1 is a block diagram showing an example of the construction of a control circuit of a DC servomotor for driving an optical system of an electrophotographic copying machine. This control circuit uses a PWM (pulse width modulation) signal as a voltage applied to the DC servomotor.

This DC servomotor 10 is of a permanent magnet field type, which is driven by a driver portion 11 to move an optical system 17.

A rotary encoder 12 is connected to the axis of rotation of the servomotor 10. The rotary encoder 12 outputs a speed detection pulse every time the servomotor 10 is rotated by a predetermined very small angle, as has been already known. A-phase and B-phase speed detection pulses which have the same period and are shifted in phase by 90° are outputted from the rotary encoder 12 according to the present embodiment. Speed detection pulses in the respective phases, for example, 200 speed detection pulses are outputted by one rotation of the servomotor 10.

Meanwhile, the rotary encoder 12 may be replaced with other equipments for outputting pulses which are periodically changed in synchronism with the rotation of the servomotor 10.

The speed detection pulse outputted from the rotary encoder 12 is applied to an encoder signal input portion 13. The encoder signal input portion 13 is a circuit for detecting the rotation of the servomotor 10 on the basis of the speed detection pulse applied from the rotary encoder 12, as described in detail later. An output of the encoder signal input portion 13 is applied to a control portion 14.

The control portion 14 comprises, for example, a CPU, a ROM having a program or the like stored therein, a RAM for storing necessary data and performs processing such as calculation processing of PWM data for controlling the servomotor 10.

An operation command signal and a speed command signal or speed command clock are applied to the control portion 14 from a control portion (not shown) of the main body of the electrophotographic copying machine. The speed command clock is subjected to signal processing in a speed command signal input portion 15 and then, applied to the control portion 14.

A PWM unit 16 is a unit for generating a PWM signal having a pulse width (output duty) corresponding to the PWM data applied from the control portion 14. The rotational speed of the servomotor 10 is controlled by the PWM signal outputted from the PWM unit 16.

The driver portion 11 determines the direction of rotation of the servomotor 10 or brakes the servomotor 10 on the basis of a driver portion driving signal applied from the control portion 14.

In order to rotate the servomotor 10 at a desired command speed, it is necessary that the rotational speed of the servomotor 10 has been accurately detected.

Figure 2:
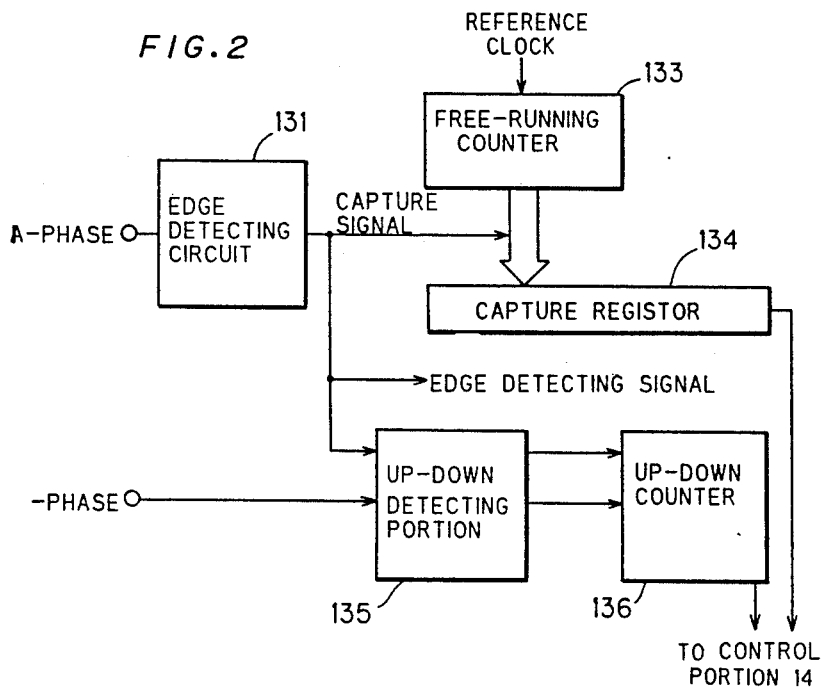
FIG. 2 is a block diagram showing the construction of main parts of a rotational speed detector of the DC servomotor for driving an optical system according to one embodiment of the present invention.

This control circuit is adapted to be capable of accurately detecting the speed of the servomotor 10 by constructing the encoder signal input portion 13 as shown in FIG. 2 and devising reading of signals by the control portion 14.

Referring to FIG. 2, the encoder signal input portion 13 comprises a leading edge detecting circuit 131 for detecting the leading edge of the A-phase speed detection pulse sent from the rotary encoder 12, a free-running counter 133 of, for example, 16-bit construction for counting reference clock pulses, and a capture register 134 for reading and holding a count number in the free-running counter 133 by using as a capture signal a leading edge detection output of the leading edge detecting circuit 131 and using as a trigger the capture signal.

The reference clock is a clock that provides operation timing for the whole circuit shown in FIG. 1. If the circuit is constituted by a microcomputer, a machine clock is utilized. In addition, if there is no such reference clock, a reference clock generating circuit may be provided.

The encoder signal input portion 13 further comprises an up-down detecting portion 135 and an up-down counter 136. The up-down detecting portion 135 determines the level of the B-phase rotating pulse when the leading edge detection output of the A-phase speed detection pulse is applied from the leading edge detecting circuit 131 to determine whether the servomotor 10 is rotated in the forward direction or the reverse direction depending on whether the B-phase rotating pulse is at a high level or a low level. The up-down counter 136 counts the detection output of the leading edge detecting circuit 131 up or down on the basis of a determination output of the up-down detecting portion 135.

Description is now made of an operation of the circuit shown in FIG. 2.

The contents of the capture register 134 are updated every time a capture signal, that is, the leading edge of an A-phase speed detection pulse is detected. In addition, the up-down counter 136 counts the number of times of detection of the leading edge of the speed detection pulse, that is, the number of speed detection pulses.

Therefore, if the up-down counter 136 counts a count number of reference clock pulses counted by the free-running counter 133 while counting n speed detection pulses within a predetermined sampling time period $\Delta T$, the number N of rotations can be calculated on the basis of the count number.

More specifically, let f[Hz] be the frequency of a reference clock, let C[ppr] be the number of A-phase speed detection pulses outputted from the rotary encoder 12 by one rotation of the servomotor 10, let $CPT_n$ be the present contents of the capture register 134, let $CPT_{n-1}$ be the preceding contents of the capture register 134, and let n be the number of speed detection pulses counted. In this case, rotational speed N[rpm] of the servomotor 10 can be calculated by the following equation:

$$N = \frac{n}{\frac{(CPT_n - CPT_{n-1})}{f} \times C} \times 60 \quad (6)$$

Since the frequency f of the reference clock and the number C of the speed detection pulses are constants, the equation (6) is as follows:

$$N = \frac{nA}{CPT_n - CPT_{n-1}} = \frac{nA}{X} \quad (7)$$

where $$A: \frac{f}{C} \times 60$$

$$X: CPT_n - CPT_{n-1}.$$

An error N' of the rotational speed N of the servomotor 10 expressed by the equation (7) becomes an absolute value obtained by differentiating N for a variable X and therefore, is expressed by the following equation:

$$N' = \left| \frac{d}{dx} N \right| = \left| \frac{d}{dx} AX^{-1} \right| = |-AX^{-2}| = \frac{A}{X^2} \quad (8)$$

where $$X = \frac{A}{N}$$

Accordingly, $$N' = \frac{1}{A} N^2 \quad (9)$$

More specifically, the relation between the rotational speed N of the servomotor 10 and the error N' is such a relation that the error N' is increased at a rate of the second power of the rotational speed N if the rotational speed N is increased. In other words, if the rotational speed N of the servomotor 10 is increased, the error N' is increased, so that detecting precision of the rotational speed N is degraded.

Description was made of a case where the count number in the free-running counter 133 is counted while one speed detection pulse is outputted. Description is now made of a case where the count number in the free-running counter 133 is counted while two speed detection pulses are outputted. In this case, the rotational speed N is as follows:

$$N = \frac{2A}{X} \quad (10)$$

The relation between the rotational speed N and the error N' is as follows:

$$N' = \frac{1}{2A} N^2 \quad (11)$$

More specifically, in general, if the count number of the reference clock counted by the free-running counter 133 while n speed detection pulses are outputted is counted to calculate the rotational speed N on the basis of the count number, the rotational speed N is expressed by the following equation:

$$N = \frac{nA}{X} \quad (12)$$

The relation between the rotational speed N and the error N' is as follows:

$$N' = \frac{1}{nA} N^2 \quad (13)$$

Figure 3A:
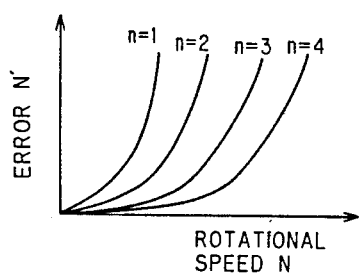
FIGS. 3A and 3B are graphs showing the relation between the number N of rotation of the motor and an error N'.

The relation between the rotational speed N and the error N' is represented by a graph as shown in FIG. 3A.

The motor control circuit according to the present embodiment is adapted such that the error N' which attempts to be increased at a rate of the second power of the rotational speed N as expressed by the equation (7) with the increase in the rotational speed N is limited to the increase at a rate of the first power thereof to suppress the error N' so that the rotational speed N can be accurately detected by paying attention to the relation between the rotational speed N and the error N' and devising sampling timing at which the control portion 14 reads out count numbers of the capture register 134 and the up-down counter 136 to increase the number n of speed detection pulses with the increase in the rotational speed N.

More specifically, let $\Delta t$ be one sampling time from a given sampling time to the next sampling time. In this case, at least one speed detection pulse, that is, a detection output of the leading edge detecting circuit 131 must be derived within the sampling time $\Delta t$ so as to detect the rotational speed N.

To do so, the above described equation (12) must meet the following requirement:

$$X \leq \Delta t$$

Eventually, the rotational speed N and the error N' must meet the following relation:

$$N' \geq (1/\Delta t) N \quad (14)$$

Figure 3B:
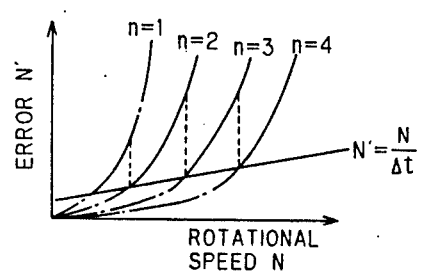

The relation given by the expression (14) holds above a straight line $N' = (1/\Delta t) N$ as shown in FIG. 3B.

Accordingly, the sampling time $\Delta t$ is set to suitable constant time satisfying the relation given by the expression (14), thereby to make it possible to detect the rotational speed N by making good use of portions represented by heavy lines in FIG. 3B, that is, the range in which the error N' is relatively small with respect to the rotational speed N.

Figure 4:
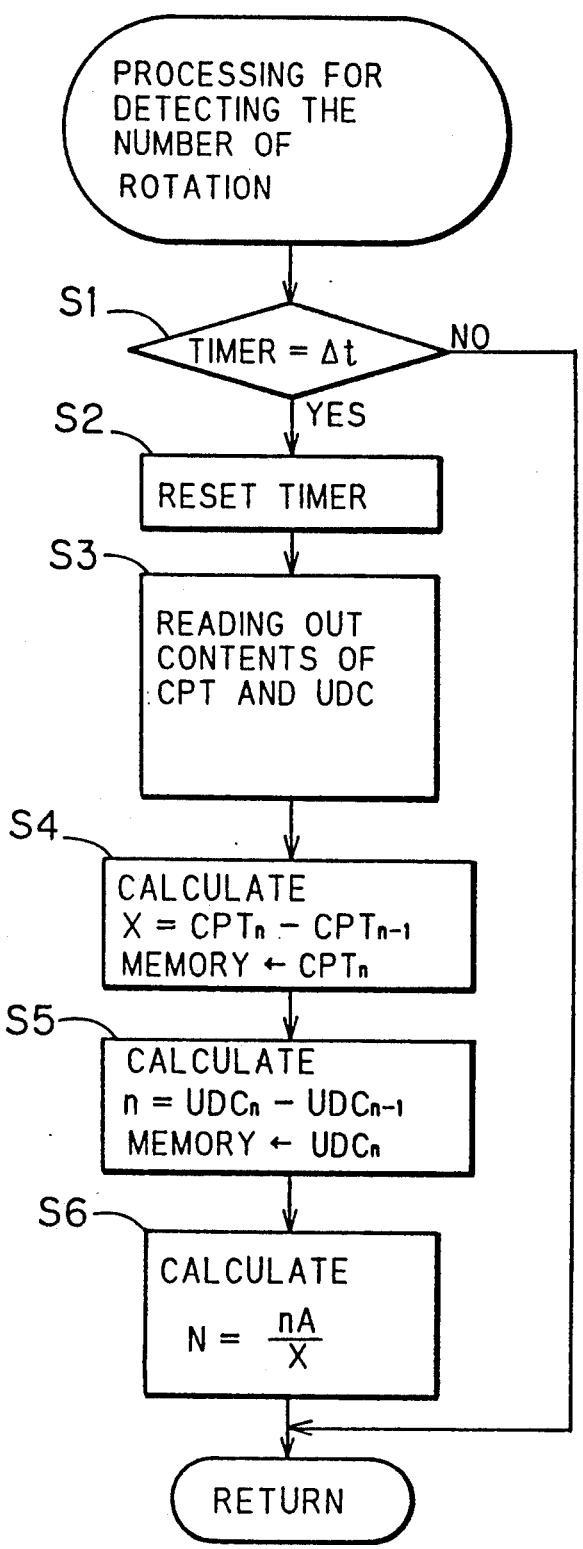
FIG. 4 is a flowchart showing the procedure for rotational speed detection processing according to one embodiment of the present invention.

FIG. 4 shows the procedure for processing performed by the control portion 14 for reading out the contents of the capture register 134 and the up-down counter 136 for each sampling time Δt to calculate the rotational speed N.

The sampling time Δt has been set to time satisfying the expression (14).

Description is now made with reference to FIGS. 2, 3 and 4.

In the control portion 14, every time an inner timer reaches constant sampling time Δt (step S1), the timer is reset (step S2). The contents of the capture register 134 and the up-down counter 136 are read out (step S3).

Then, a count number $CPT_{n-1}$ read out the last time in the capture register 134 which is stored in a memory is subtracted from a count number $CPT_n$ read out this time in the capture register 134, thereby to find the number X of reference clock pulses within one sampling time Δt and then, the count number $CPT_n$ is stored in the memory (step S4).

On the other hand, a count number $UDC_{n-1}$ read out the last time in the up-down counter 136 which is stored in the memory is subtracted from a count number $UDC_n$ read out this time in the up-down counter 136, to find the number of rotating pulses within one sampling time Δt and then, the count number $UDC_n$ is stored in the memory (step S5).

Thereafter, the rotational speed N of the servomotor 10 is found on the basis of the above described equation (12) (step S6).

In the steps S5 and S6, if the rotational speed N of the servomotor 10 is increased, the number n of speed detection pulses is gradually increased within the sampling time Δt. Accordingly, the rotational speed N of the servomotor 10 can be detected utilizing the portions represented by the heavy lines in FIG. 3B, as described above.

Description is now made of the speed command signal input portion 15 in FIG. 1.

Figure 5:
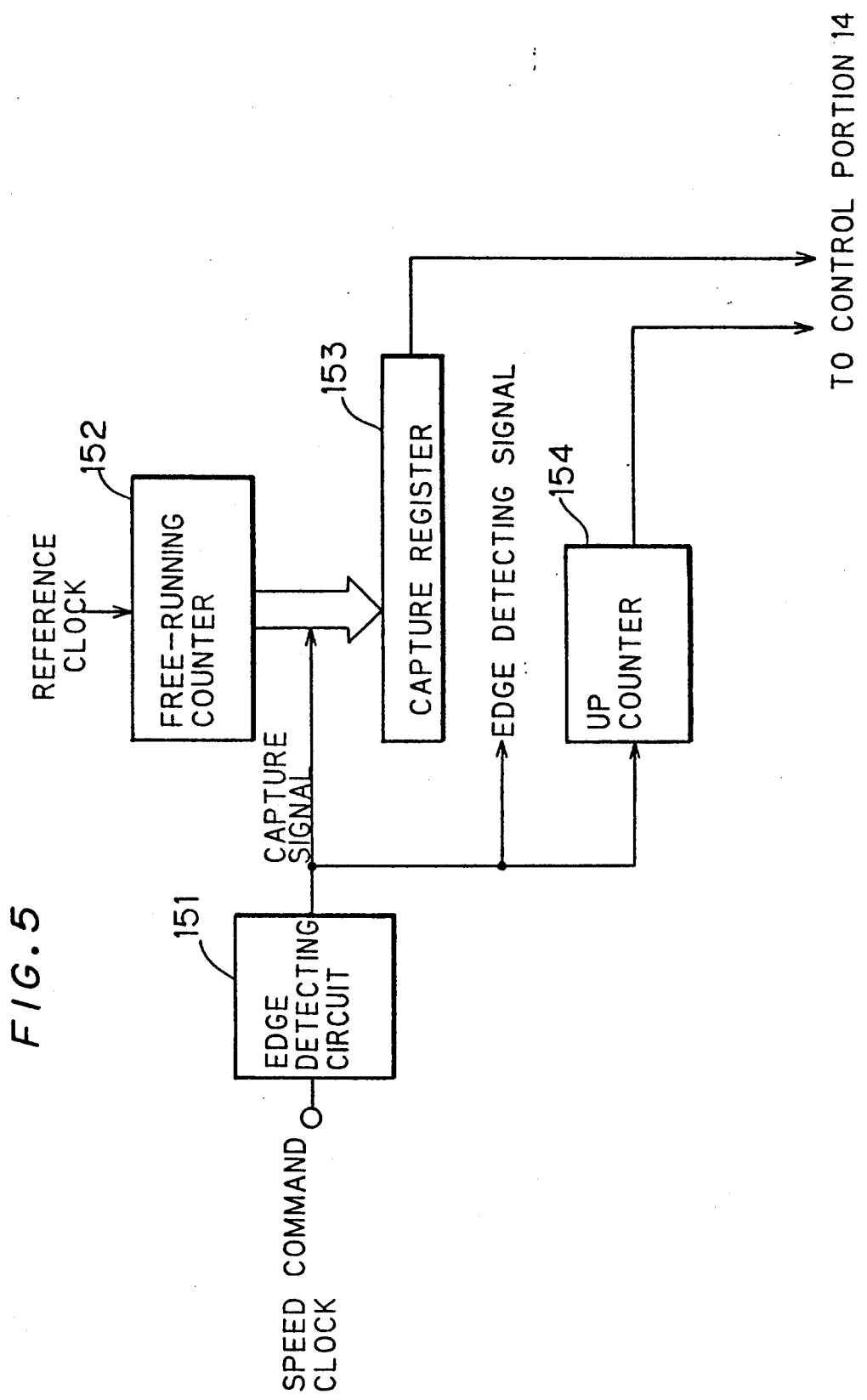
FIG. 5 is a block diagram showing an example of the specific construction of a speed command signal input portion.

FIG. 5 is a block diagram showing an example of the specific construction of the speed command signal input portion 15. The speed command signal input portion 15 comprises a leading edge detecting circuit 151 for detecting the leading edge of a speed command clock, a free-running counter 152 for counting reference clock pulses up, a capture register 153 for reading out a count number in the free-running counter 152 to hold the same by using a leading edge detection output of the leading edge detecting circuit 151 as a capture signal and using the capture signal as a trigger, and an up counter 154 for counting output pulses of the leading edge detecting circuit 151 up.

The free-running counter 152 is a counter of, for example, 16-bit construction. The free-running counter 133 in the above described encoder signal input portion 13 (see FIG. 2) may be also used as this free-running counter 152.

Operation of this circuit is as follows.

A speed command clock pulse outputted from a microcomputer on the side of the main body of the device, for example, on the side of control of the main body of the electrophotographic copying machine is applied to the leading edge detecting circuit 151, and the leading edge of the speed command clock pulse is detected in the leading edge detecting circuit 151. An output of the leading edge detecting circuit 151 is applied to the free-running counter 152 as a capture signal. Accordingly, the contents of the capture register 153 are updated in response to the leading edge of the speed command clock. Consequently, if the contents of the capture register 153 are read out on the basis of a given leading edge detection signal and the contents of the capture register 153 are read out on the basis of the next leading edge detection signal to find the difference therebetween, a count number in one period of the speed command clock in the free-running counter 152 can be counted. More specifically, the rotational speed $N_0$ to be a command speed can be obtained.

The present embodiment employs not a method of finding a count number corresponding to the difference between a count number after updating and a count number before updating every time the contents of the capture register 153 are updated but the same reading method as the method of reading out the count number in the capture register 134 in the encoder signal input portion 13 is employed.

More specifically, the control portion 14 reads out the contents of the capture register 153 and the contents of the up-down counter 154 for each predetermined sampling time Δt, finds the difference between the count number read out this time and the count number read out the last time in the capture register 153, and divides the difference therebetween by the difference between the count number read out the last time and the count number read out this time in the up counter 154, thereby to find the number of reference clock pulses within one period of the speed command clock more accurately.

Figure 6:
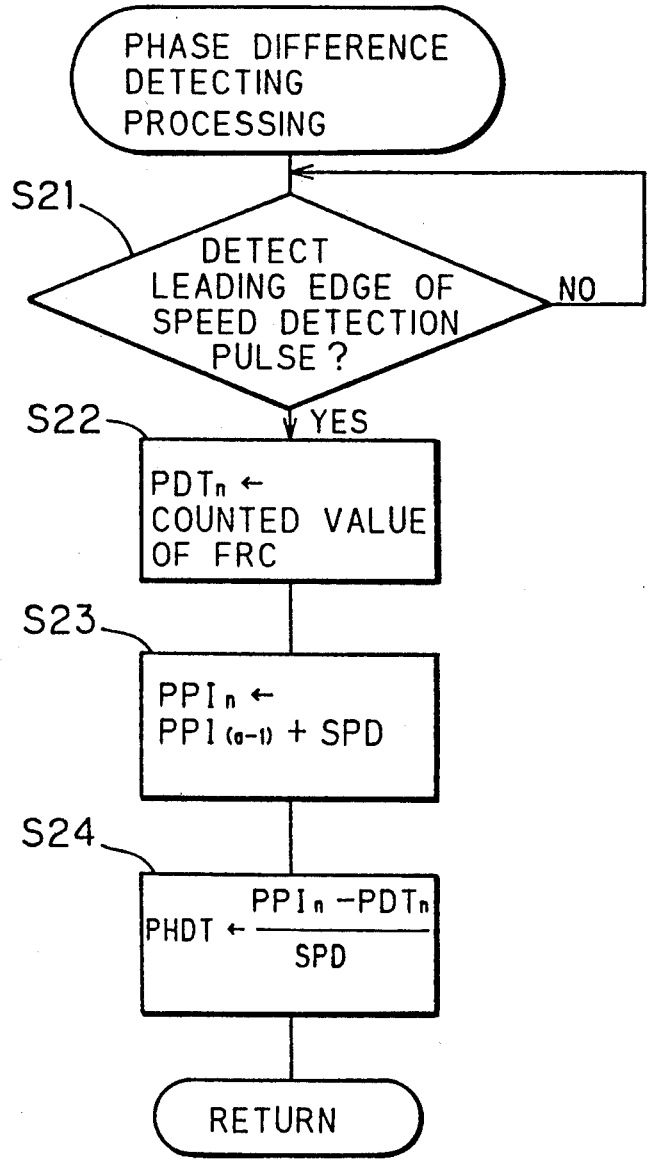
FIG. 6 is a flowchart showing the procedure for phase difference calculation processing.

FIG. 6 shows the procedure for processing performed by the control portion 14 for calculating the phase difference between the speed command clock and the speed detection pulse.

First, when the leading edge of the speed detection pulse is detected by the leading edge detecting circuit 131 in the encoder signal input portion 13 (step S21), a counted value in the free-running counter 133 is read and the value is stored as a phase comparison value $PDT_n$ (step S22). The free-running counter 133 starts counting reference clock pulses from the start of motor control. Accordingly, the phase comparison value $PDT_n$ becomes a value corresponding to the speed from the start of motor control to the time point where the leading edge of the pulse is detected this time.

The phase comparison value $PPI_n$ is then calculated in the following equation and stored (step S23):

$$PPI_n = PPI_{(n-1)} + SPD \quad (15)$$

where
$PPI_{(n-1)}$: phase reference value stored the last time
SPD: the number of reference clock pulses in one period of the speed command clock (SPD is a fixed value).

Since the initial value of $PPI_{(n-1)}$ is zero, however, the phase reference value $PPI_n$ corresponding to the time point where the first leading edge of the speed detection pulse is detected after the start of motor control in the above described step S21 becomes SPD.

Thereafter, a phase difference PHDT is calculated by the following equation and stored (step S24):

$$PHDT = \frac{PPI_n - PDT_n}{SPD} \quad (16)$$

The foregoing processing is repeated. More specifically, every time the leading edge of the speed detection pulse is detected (step S21), the reading of the counted value in the free-running counter 133 and the updating of the phase comparison value $PDT_n$ (step S22), the calculation and updating of the phase reference value $PPI_n$ (step S23) and the calculation of the phase difference PHDT (step S24) are repeated.

After motor control is started, the phase reference value $PPI_n$ calculated in the step S23 is 2SPD when the second leading edge of the speed detection pulse is detected in the step S21 while being 3SPD when the third leading edge of the speed detection pulse is detected. More specifically, the phase reference value $PPI_n$ calculated in the step S23 becomes the product of SPD and the total number of speed detection pulses outputted from the start of motor control to the time point where the leading edge of the speed detection pulse is detected this time. SPD is a fixed value corresponding to the period of the speed command clock. Accordingly, the phase reference value $PPI_n$ calculated in the step S23 becomes a value corresponding to the time from the start of motor control to the time point of the leading edge of a speed command clock pulse corresponding to the speed detection pulse whose leading edge is detected this time.

The difference between a value corresponding to the time from the start of motor control to the time point where the leading edge of the speed detection pulse is detected this time (the phase comparison value $PDT_n$) and a value corresponding to the time from the start of motor control to the time point of the leading edge of the speed command pulse corresponding to the speed detection pulse whose leading edge is detected this time (the phase reference value $PPI_n$) is divided by a value (SPD) corresponding to the period of the speed command clock, thereby to calculate the phase difference PHDT. Accordingly, every if the phase difference between the speed command clock and the speed detection pulse is one period or more of the speed command clock, the phase difference PHDT is accurately detected.

The phase difference PHDT detected in the above described manner is fed back to PWM data in the following manner.

Since a voltage V for PWM data is calculated by the equation (18) as described later, an output voltage $V_{OUT}$ for PWM data is determined by adding and subtracting a coefficient $\alpha$ times the phase difference PHDT detected to and from the voltage V calculated.

$$V_{OUT} = V + \pm \alpha \cdot PHDT \quad (17)$$

If the coefficient $\alpha$ in the above equation (17) is altered, the ratio of the phase difference can be adjusted, thereby to make it possible to control the servomotor 10 at a constant speed with it more rapidly following the speed.

Description is now made of a method of calculating the voltage V. The voltage V is expressed by the following equation using a difference $\Delta N$ in speed between the actual rotational speed $N_S$ of the servomotor 10 and the command rotational speed $N_O$ applied from the speed command signal input portion 15:

$$= \frac{R_a GD^2}{375 K_T} \cdot \frac{\Delta N}{\Delta t} + K_e N_s + R_a(I_0 + T_{BL}/K_T) \quad (18)$$

where
Ra: armature resistance [Ω]
$K_T$: torque constant [kgm/A]
$k_e$: induced voltage constant [V/rpm]
$I_O$: no-load current [A]
$GD^2$: moment of inertia by load and motor [kgm$^2$]
$T_{BL}$: sliding load [kgm]

Acceleration in a case where the voltage V expressed by this equation (18) is applied is as follows with the substitution of the equation (18) in the above described equation (4) and with the substitution $N_S = (N_O - \Delta N)$:

$$a = \frac{375 K_T K_e}{R_a GD^2} \times \left[ \left( R_a \left( \frac{GD^2}{375 K_T} \cdot \frac{\Delta N}{\Delta t} + I_0 + \frac{T_{BL}}{K_T} \right) + K_e N_s - R_a(I_0 + T_{BL}/K_T) \right) \div K_e - N_s \right] =$$

$$\frac{375 K_T K_e}{R_a GD^2} \left( \frac{R_a}{K_e} \cdot \frac{GD^2}{375 K_T} \cdot \frac{\Delta N}{\Delta t} \right) = \frac{\Delta N}{\Delta t} \quad (19)$$

The difference $\Delta N$ in speed divided by $\Delta t$ becomes acceleration. Constant acceleration most suitable for $\Delta N$ is obtained by optimizing $\Delta t$.

Description is now made of the process of deriving the above described equation (18).

Figure 7:
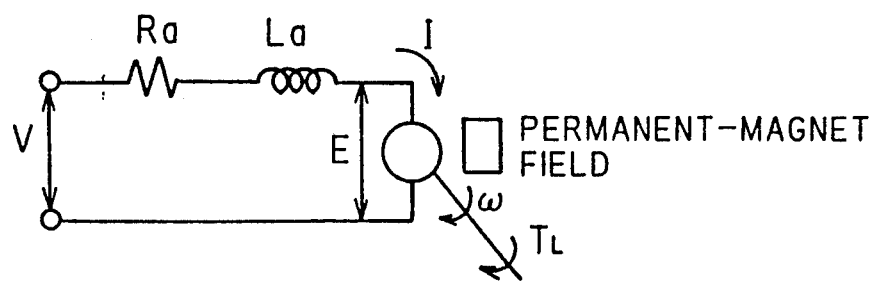
FIG. 7 is a diagram showing an equivalent circuit of a permanent-magnet field type DC servomotor.

FIG. 7 is a diagram showing an equivalent circuit of the permanent-magnet field type DC servomotor 10.

A transfer function of the motor in a case where a signal voltage V is applied to an armature of the motor to obtain angular displacement $\theta$ of the axis of rotation as an output is derived as follows:

$$L_a \frac{dI}{dt} + R_a I + E = V \quad (20)$$

An induced voltage E of the motor is proportional to the angular velocity $\omega$ of the axis of rotation and therefore:

$$E = K_e \omega = K_e \frac{d\theta}{dt} \quad (21)$$

where Ke: induced voltage constant

Generated torque is proportional to an armature current I and therefore:

$$T = K_T I \quad (22)$$

where $K_T$: torque constant

Let J be the sum of the moment of inertia of a rotor and the moment of inertia by a load and let B be a braking load of the motor including the loss of a bearing. In this case, load torque $T_L$ is as follows:

$$T_L = J \frac{d\omega}{dt} + B\omega \quad (23)$$

The generated torque of the motor is equal to the load torque thereof and therefore:

$$K_T I = J \frac{d\omega}{dt} + B\omega \qquad (24)$$

Since the inductance La of an armature circuit is generally designed to be smaller as compared with the moment of inertia J, La=0.

Furthermore, the braking load B is negligible. If B=0, therefore, the equation (20) is as follows:

$$V = RaI + E \qquad (25)$$

The equation (23) is as follows:

$$T_L = J \frac{d\omega}{dt} \qquad (26)$$

The moment of inertia J [Kgmsec$^2$] is changed to GD$^2$ [kg m$_2$] because it is convenient to use GD$^2$.

$$GD^2 = Mg(2k)^2 \qquad (27)$$

where
G=Mg: weight of object [Kg]
M: mass
g: gravitational acceleration [9.8 m/sec$^2$]
k: radius of gyration The physical moment of inertia J [kgmsec$^2$] is expressed by the following equation considering that the whole mass is concentrated in a place at some distance away:

$$J = Mk^2 \qquad (28)$$

Therefore, $$GD^2 = 4gJ \qquad (29)$$

From the equations (26) and (29), the following equations are obtained:

$$T_L = \frac{GD^2}{4g} \cdot \frac{d\omega}{dt} \qquad (30)$$

$$\frac{d\omega}{dt} = \frac{\Delta N(2\pi/60)}{\Delta t} \qquad (31)$$

From the equations (30) and (31), the following equations are obtained:

$$T_L = \frac{GD^2}{4g} \cdot \frac{2\pi}{60} \cdot \frac{\Delta N}{\Delta t}$$

$$= \frac{2\pi}{4g \times 60} \cdot \frac{\Delta N}{\Delta t} \cdot GD^2$$

$$\left( \because \frac{2\pi}{4g \times 60} = \frac{1}{374.332462} \approx \frac{1}{375} \right)$$

Therefore, $$T_L = \frac{GD^2}{375} \cdot \frac{\Delta N}{\Delta t} \qquad (32)$$

Torque required to obtain the amount $\Delta N$ of change in the rotational speed within the time $\Delta t$ is expressed by this equation (32).

The required load torque is the generated torque of the motor. Accordingly, the following equations are obtained from the equations (22) and (32):

$$K_T I = \frac{GD^2}{375} \cdot \frac{\Delta N}{\Delta t} \qquad (33)$$

$$I = \frac{GD^2}{375 K_T} \cdot \frac{\Delta N}{\Delta t}$$

From the equation (22), the generated torque and the current are given by a proportional expression where $K_T$ is a constant. However, there is a current required even in the unloaded condition (no-load current).

Let $I_O$ be the no-load current. In this case, the following equation is obtained:

$$I = \frac{GD^2}{375 K_T} \cdot \frac{\Delta N}{\Delta t} + I_o \qquad (34)$$

Then, an actual driving control method is of a voltage driving type using a PWM signal. Accordingly, the following equation is obtained from the equations (25) and (34):

$$V = Ra \left( \frac{GD^2}{375 K_T} \cdot \frac{\Delta N}{\Delta t} \right) + RaI_0 + E \qquad (35)$$

In this case, the induced voltage E is as follows:

$$E = K_E N$$

where $K_E$: induced voltage constant. Accordingly, the equation (35) is as follows:

$$V = Ra \left( \frac{GD^2}{375 K_T} \cdot \frac{\Delta N}{\Delta t} \right) + RaI_0 + K_e N \qquad (36)$$

However, the equation (36) includes no terms of the sliding load and the braking load on the motor. Let $T_{BL}$ be the sliding load and the braking load. In this case, $T_{BL}$ is as follows:

$$T_{BL} = \frac{I}{K_T} \qquad (37)$$

The braking load $T_{BM}$ on the motor calculated from the no-load current $I_0$ is as follows:

$$T_{BM} = \frac{I_0}{K_T} \qquad (38)$$

The braking load $T_B$ ($B\omega$) in the equation (23) is as follows:

$$T_B = T_{BL} + T_{BM} \qquad (39)$$
$$T_B = \frac{I + I_0}{K_T}$$

Consequently, the equation (36) is as follows:

$$V = Ra \left( \frac{GD^2}{375 K_T} \cdot \frac{\Delta N}{\Delta t} \right) + RaI_0 + Ra(T_{BL}/K_T) + K_e N \qquad (40)$$

$$V = Ra\left(\frac{GD^2}{375K_T} \cdot \frac{\Delta N}{\Delta t} + I_0 + \frac{T_{BL}}{K_T}\right) + KeN$$

To summerize the foregoing, when the difference $\Delta N$ in speed from the target rotational speed $N_0$ arises, the voltage V obtained in the following equation may be applied to the motor:

$$V = Ra\left(\frac{GD^2}{375K_T} \cdot \frac{\Delta N}{\Delta t} + I_0 + \frac{T_{BL}}{K_T}\right) + KeN_s = \frac{RaGD^2}{375K_T} \cdot \frac{\Delta N}{\Delta t} + KeN_s + Ra(I_0 + T_{BL}/K_T) \quad (18)$$

Accordingly, $N_0$, $\Delta N$ and $\Delta t$ become variables at the time of control.

Figure 8:
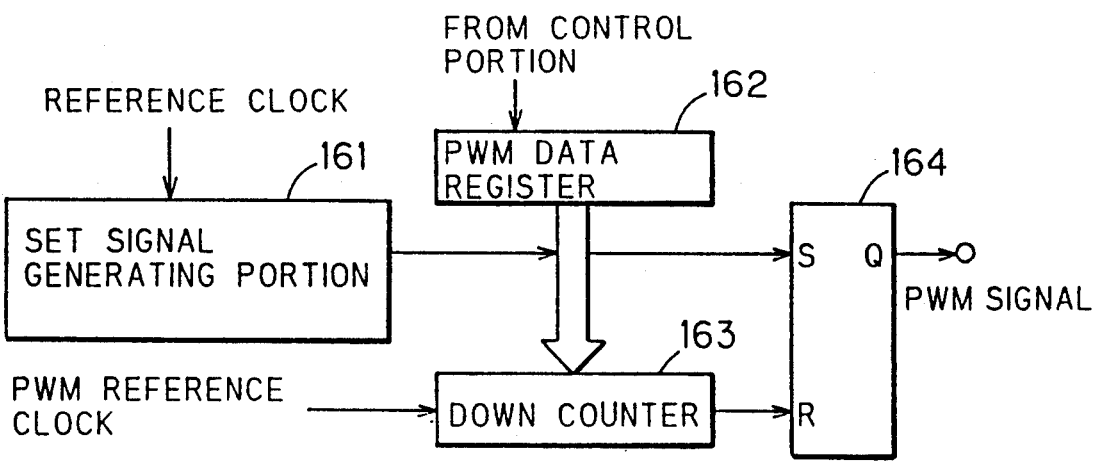
FIG. 8 is a block diagram showing the specific construction of a PWM unit.
Figure 9:
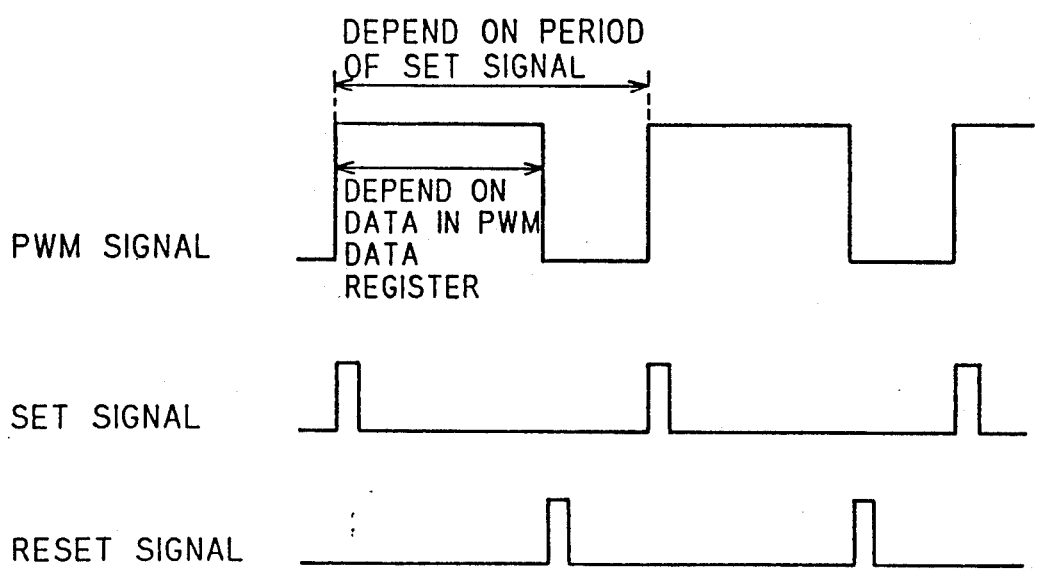
FIG. 9 is a timing chart showing an operation of the PWM unit.

FIG. 8 is a block diagram showing an example of the specific construction of the PWM unit 16, and FIG. 9 is a timing chart for explaining an operation of the PWM unit 16.

The PWM unit 16 comprises a set signal generating portion 161, a PWM data register 162, a down counter 163 and an RS flip-flop 164.

The set signal generating portion 161 generates a set signal for each constant period. This set signal generating portion 161 is constituted by, for example, a ring counter and is adapted to generate a set signal every time it counts a constant number of reference clock pulses.

The PWM data register 162 is used for holding PWM data applied from the control portion 14. The PWM data applied from the control portion 14 is a voltage $V_{OUT}$ found in the above described equation (17), that is, a voltage $V_{OUT}$ obtained by correcting the voltage V given in the equation (18) by data on the phase difference PHDT. This PWM data is used for determining the duty of a PWM output signal outputted from the PWM unit 16.

The down counter 163 counts PWM reference clock pulses (in the present embodiment, the reference clock pulses used in the encoder signal input portion 13 and the speed command signal input portion 15 are also used as the PWM reference clock pulses) down every time they are applied and outputs a reset signal when the set number is counted.

The operation of the PWM unit 16 is as follows. When a set signal is outputted from the set signal generating portion 161, the contents of the PWM data register 162, that is, PWM data applied from the control portion 14 is set in the down counter 163. Further, the flip-flop 164 is set by the set signal. Consequently, an output of the flip-flop 164, that is, a PWM signal attains a high level.

The down counter 163 then counts PWM reference clock pulses down every time they are applied and applies a reset signal to the flip-flop 164 when the set counted value becomes zero. Accordingly, the output of the flip-flop 164 is changed to a low level.

As a result, the duty is determined by a value held in the PWM data register 162, that is, voltage data calculated in the equation (11), so that the PWM signal is derived from the PWM unit 16.

Meanwhile, the present invention is not limited to a device for controlling an optical system of an electrophotographic copying machine. For example, it can be applied to a motor for controlling a reader of a facsimile and other general motor control circuits.

Furthermore, the present invention can be applied to a case where an applied voltage is calculated by signals other than the PWM signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling the rotational speed of a motor with a voltage responsive control device, said method comprising the steps of:

determining a target rotational speed $N_o$ for the motor;

determining an actual rotational speed $N_s$ of the motor during a predetermined sampling time $\Delta t$;

calculating a control voltage V for controlling the rotational speed of the motor according to the following equation:

$$V = \frac{RaGD^2}{375\,K_T} \cdot \frac{(N_o - N_s)}{\Delta t} + K_e N_s + Ra(I_0 + T_{BL}/K_T)$$

where,
Ra: is armature resistance [Ω]
$K_T$: is a torque constant [kgm/A]
$K_e$: is an induced voltage constant [Vrpm]
$I_o$: is no-load current [A]
$GD^2$: is the moment of inertia by load and motor [kgm²]
$T_{BL}$: is sliding load [kgm]; and applying the control voltage V to the voltage responsive control device to control the speed of the motor.

2. A motor control device for controlling the rotational speed of a motor on the basis of the difference between a command speed $N_o$ and an actual detected speed $N_s$, said control device comprising:

a voltage responsive control device for changing the rotational speed of the motor;

means for setting the command speed $N_o$;

speed detecting means for detecting the actual rotational speed $N_s$ of the motor during a predetermined sampling time $\Delta t$;

calculating means for calculating a control voltage V for controlling the rotational speed of the motor according to the following equation:

$$V = \frac{RaGD^2}{375\,K_T} \cdot \frac{(N_o - N_s)}{\Delta t} + K_e N_s + Ra(I_0 + T_{BL}/K_T)$$

where,
Ra: is armature resistance [Ω]
$K_T$: is a torque constant [kgm/A]
$K_e$: is an induced voltage constant [Vrpm]
$I_o$: is no-load current [A]
$GD^2$: is the moment of inertia by load and motor [kgm²]
$T_{BL}$: is sliding load [kgm]; and control voltage output means for outputting the control voltage V calculated by the calculating means to the voltage response control device.

3. The motor control device according to claim 2, wherein the speed detecting means comprises:

pulse output means connected to the axis of rotation of the motor for outputting axis rotation pulses every time the axis of rotation is rotated by a predetermined very small angle;

reference clock pulse counting means for counting reference clock pulses applied thereto;

axis rotation pulse counting means for counting the axis rotation pulses outputted from the pulse output means;

reading means for reading count numbers in the reference clock counting means and the axis rotation pulse counting means for each predetermined sampling time $\Delta t$; and rotational speed calculating means for finding the number of reference clock pulses and the number of axis rotation pulses within one sampling time $\Delta t$ measured from a preceding sampling time to a present sampling time on the basis of reading of count numbers by the reading means and for calculating the motor rotational speed according to the following equation:

$$N_s = \frac{n}{\frac{(CPT_n - CPT_{n-1})}{f} \times C} \times 60$$

$$= \frac{nA}{X}$$

where, $A = \frac{f}{C} \times 60$ $X = CPT_n - CPT_{n-1}$: is the number of reference clock pulses $CPT_n$: is the present count number in the reference clock counting means $CPT_{n-1}$: is the preceding count number in the reference clock counting means n: is the number of axis rotation pulses C [ppr]: is the number of the axis rotation pulses by one rotation f [Hz]: is the frequency of a reference clock.

4. A motor control device for carrying out feedback control of a motor such that an actual rotational speed $N_s$ of the motor is equal to a target rotational speed $N_o$ thereof, said control device comprising:

means for setting the target rotational speed $N_o$;

speed detecting means for detecting the actual rotational speed $N_s$ of the motor during a predetermined sampling time $\Delta t$;

calculating means for calculating a control voltage V for controlling the rotational speed of the motor according to the following equation:

$$V = \frac{R_a GD^2}{375 K_T} \cdot \frac{(N_o - N_s)}{\Delta t} + K_e N_s + R_a(I_o + T_{BL}/K_T)$$

where, $R_a$: is armature resistance $[\Omega]$ $K_T$: is a torque constant [kgm/A]

$K_e$: is an induced voltage constant [Vrpm]

$I_o$: is no-load current [A]

$GD^2$: is moment of inertia by load and motor [kgm$^2$]

$T_{BL}$: is sliding load [kgm];

phase difference detecting means for detecting the phases of the target rotational speed $N_o$ pulses output from the setting means and the actual rotational speed $N_s$ pulses output from the speed detecting means to detect the phase difference between the target and actual rotational speed pulses;

applied voltage correcting means for correcting the applied voltage calculated by the calculating means on the basis of an output of the phase difference detecting means to provide a corrected applied voltage; and means for outputting the corrected applied voltage as a control voltage.

5. The motor control device according to claim 4, wherein the phase difference detecting means comprises:

time calculating means for calculating the $PDT_n$ from a reference time point to a time point when a newest speed detection pulse is outputted following outputting of a predetermined number of speed detection pulses, and calculating time $PPI_n$ from the reference time point to a time point when a speed command pulse corresponding to the newest speed detection pulse is outputted on the basis of the total number of the speed detection pulses output from the reference time point and the period of the speed command pulse SPD; and phase difference calculating means for calculating the phase difference PHDT between the speed detection pulse and the speed command pulse according to the following equation:

$$PHDT = \frac{PPI_n - PDT_n}{SPD}.$$

* * * * *